Dec. 31, 1968          D. W. ZEHNER          3,419,779
SYSTEM FOR REMOVING A BAD BATTERY FROM CHARGING CIRCUIT
Filed Aug. 9, 1965
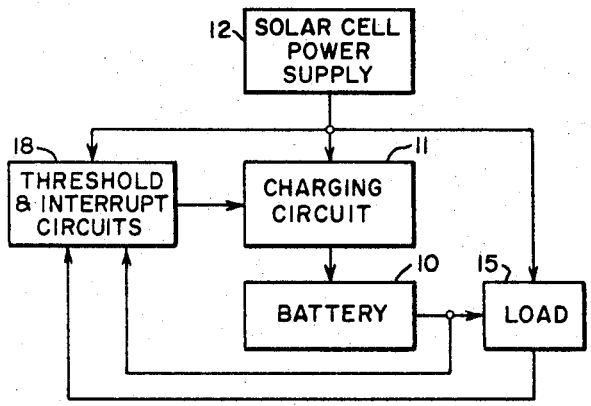
FIG. I.
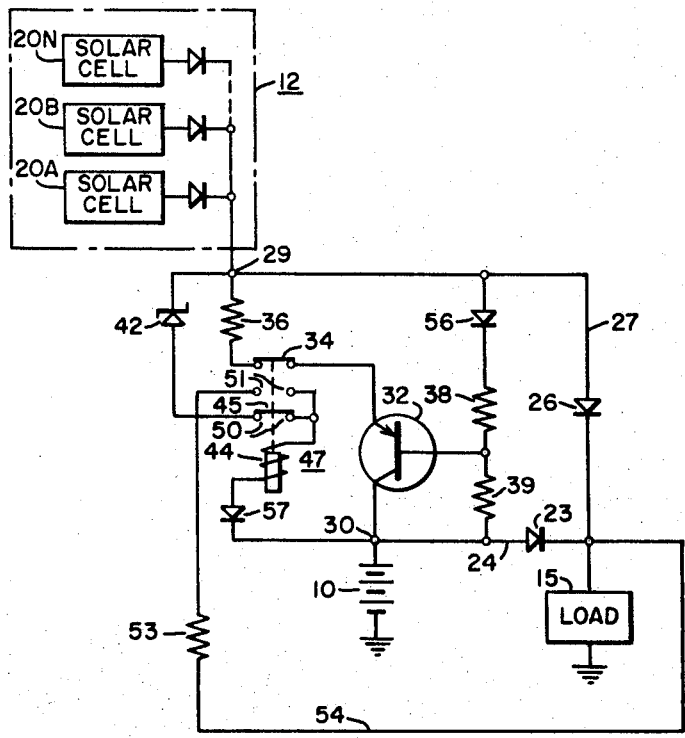
FIG. 2.
WITNESSES:
Bernard R. Giegues
James F. Young
INVENTOR.
David W. Zehner.
BY Dean Schron
ATTORNEY

United States Patent Office 3,419,779
Patented Dec. 31, 1968

3,419,779
SYSTEM FOR REMOVING A BAD BATTERY FROM CHARGING CIRCUIT
David W. Zehner, Baltimore, Md., assignor to Westinghouse Electric Corporation, Pittsburgh, Pa., a corporation of Pennsylvania
Filed Aug. 9, 1965, Ser. No. 478,321
15 Claims. (Cl. 320—6)

This invention in general relates to power supply and battery charging circuits, and in particular to an arrangement which is well adapted for use in orbiting satellites, space vehicles, or the like.

A satellite power supply system generally includes one or more solar cells in an array constituting a power supply for delivering power to a load during an orbital day, that is, during the time when the solar cells can receive energy from the sun. During the orbital night, or when the solar cells become darkened, a battery such as a nickel-cadmium battery supplies the necessary power to the load.

A battery charging circuit is provided in order to prolong battery life, in that when excess power from the solar cell array is available, the nickel-cadmium battery will be charged thereby. In the event of failure of the nickel-cadmium battery, it is removed from the system so as not to constantly drain the solar cell power. In order to provide a more reliable power supply system, two batteries are provided and these two batteries are either time shared when the solar cell power supply is off, or passive, or one battery acts as a spare or back-up for the other in the event of the other's failure.

In the situation where the batteries are time shared, a failure of one results in a part-time operation of the load. In the case where one battery acts as a back-up for the other battery, it is possible that a marginal battery may be permanently disconnected from the system and a failed battery substituted therefor.

It is therefore a primary object of the present invention to provide an improved system of the class described which eliminates the objectionable features of the prior art systems.

Another object of the invention is to provide a power supply system of the class described wherein a supposedly failed battery is not permanently disconnected from the entire system.

A further object is to provide a power supply system of the class described wherein there is a periodic attempt to place a failed battery into full service.

A further object is to provide a system of the type described wherein a temporarily removed battery is supplied with an expendable trickle charge current.

Another object is to provide a power supply system which uses a redundant battery circuit and wherein the battery with the highest charged state operates a load.

Briefly, in accordance with the above objects, the power supply system of the present invention includes a power supply means subject to on and off periods of operation, and a battery of the rechargeable type, for supplying power to a load when the power supply is in an off or passive period of operation. The power supply in the preferred embodiment comprises one or more solar cells.

A charging circuit supplies charging current to a battery for charging it with current supplied by the power supply during an on or active period of operation. If the voltage of the battery drops below a predetermined value with respect to the voltage of the power supply, the charging circuit is disconnected so that maximum solar cell power may be delivered to the load. If the battery voltage should subsequently rise above the predetermined value, the charging circuit is again connected.

The charging circuit is also reconnected when the power supply is in its off period of operation. In this manner the charging circuit is connected for charging up the battery at the beginning of each orbital sunrise (for a satellite power supply system).

In order that a load device be continuously supplied with power, a plurality of batteries may be supplied, with each battery having its own charging circuit which will remain connected between the power supply and its respective battery as long as the voltage of the power supply exceeds the voltage of the particular battery by a predetermined amount.

The above stated as well as further objects and advantages will become apparent upon a reading of the following detailed specification taken in conjunction with the drawings in which:

FIG. 1 illustrates an embodiment of the invention in block diagram form;

FIG. 2 illustrates an embodiment of the present invention in more detail; and

Figure 3:
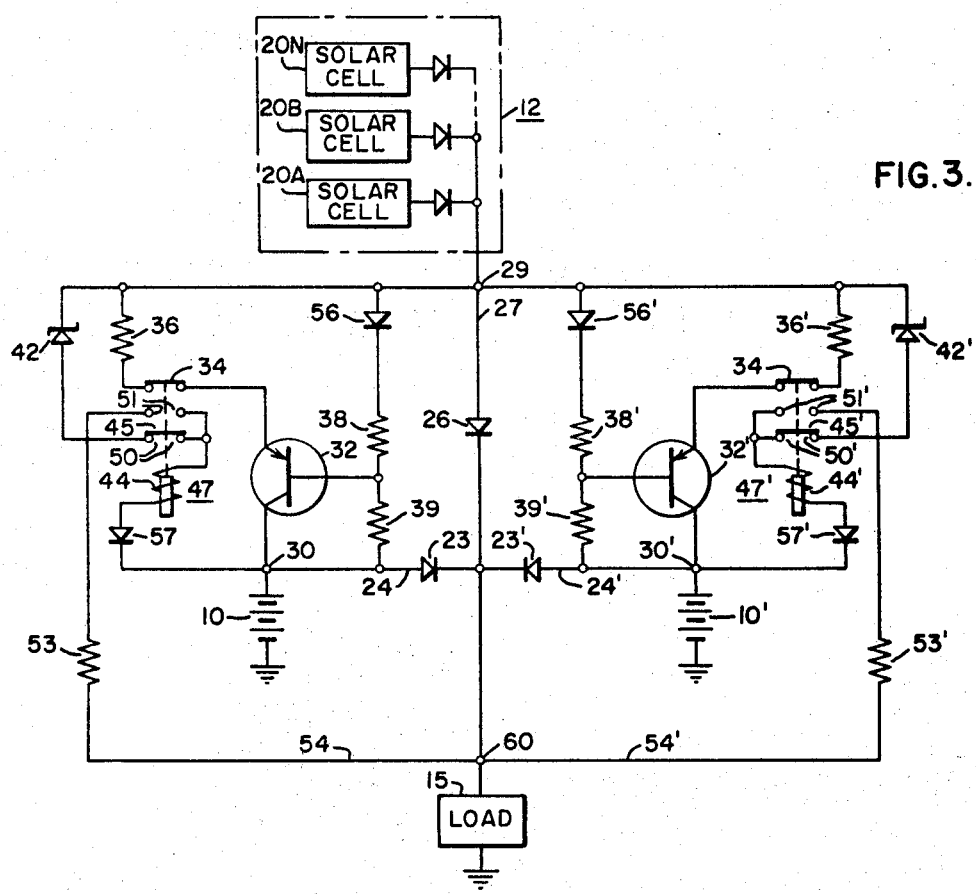
FIG. 3 illustrates another embodiment of the present invention.

In FIG. 1, a battery 10 of the rechargeable type is supplied with charging current through charging circuit 11, the charging current being supplied by a power supply 12 means subject to on and off periods of operation. In the embodiment of the invention described herein, the power supply 12 is preferably a solar cell array comprised of one or more solar cells and which provides operating power when subjected to sunlight and will remain passive when subjected to darkness. The system of FIG. 1 is particularly well adapted for use in an orbiting satellite. Means are provided to connect a load 15 to both the battery 10 and the power supply 12. The load 15 may be one or more electronic circuits requiring power. The components thus far described constitute a conventional satellite power supply system. A conventional system also includes some circuitry for permanently removing the battery if it should go bad. A greatly improved power supply system is provided herein by the inclusion of the threshold and interrupt circuits 18 which removes a bad battery from tne system and in addition, periodically replaces the battery to attempt recharge. For example, during the course of an orbital day the battery 10 might be subject to an unusual temperature increase above its designed value which would tend to cause a self-discharge wherein current flows between the electrodes in the battery. This, in conjunction with the normal satellite electrical loads could cause the battery voltage to fall off sharply. Also, battery cell separator failures may be caused by high temperature. During the course of the orbital night and with the removal of the temperature increase the defect may be eliminated. In the FIG. 1 embodiment of the present invention the charging circuit is connected to the battery at each orbital sunrise so that the previously defective battery, which would have been removed in prior art systems, is able to receive a charging current. The decision as to when to place the charging circuit 11 back into the system may be governed by conditions at the load 15. More explicitly, the interrupt circuit will keep the charging circuit 11 disconnected as long as the voltage across the load 15 is above a predetermined value. For a more detailed explanation of the operation of FIG. 1, reference should now be made to FIG. 2.

The power supply 12 is comprised of a plurality of solar cells 20A, 20B, 20N, etc. During the orbital night, or when the power supply 12 is in its passive period of operation, the load 15 is supplied by the battery 10 through diode 23 via lead 24. During the orbital day, or when the power supply 12 is in its on period of operation, the load 15 is supplied by the power supply through diode 26 via lead 27. The output of the power supply 12 may be measured at a first circuit point 29 and the output of the battery 10 may be measured at a second circuit point 30. Operatively connected between the power supply 12 and the battery 10 is a charging circuit for delivering charging current to the battery 10 when excess power is available from the power supply 12. In a preferred embodiment, the charging path between points 29 and 30 includes a transistor 32 and switch 34, and if it is desired to limit the charging current, a resistor 36 may be included. The circuit path between points 29 and 30 which includes resistor 36 constitutes a main charging path. In order to properly bias the transistor 32, a circuit path including resistors 38 and 39 is included with the base of transistor 32 connected to the junction between the resistors. This circuit path between points 29 and 30 which includes the resistors 38 and 39 not only serves to bias the transistor 32, but also serves as an auxiliary charging circuit which continuously delivers a trickle charge current substantially less than main charging current, to the battery.

During the orbital day, the power supply 12 supplies power to the load 15 and additionally supplies a charging current to charge the battery 10 which previously delivered the power to the load during the orbital night. If the battery 10 goes bad, so that it cannot be properly charged, it would be a waste of power if the power supply 12 continuously delivered a charging current. Therefore, means are provided to disconnect the charging circuit in the event that the battery voltage drops below a predetermined level. Another circuit path is connected between circuit points 29 and 30 and includes a semiconductor threshold device which in essence, compares the voltage of the power supply 12 with the voltage of the battery 10. This threshold device takes the form of Zener diode 42 having a predetermined breakdown voltage. In normal operation the voltage difference between points 29 and 30 is less than the breakdown voltage of the Zener diode 42. A relay operable in a first and second state is provided for opening and closing the charging circuit, the relay being normally in one of the states wherein the charging circuit is closed. The relay is operable to change to its opposite state to open the charging circuit for a period when the power supply voltage exceeds the battery voltage by a predetermined amount. One form of relay arrangement is illustrated in FIG. 2. A relay coil 44 and contact arm 45 are normally serially arranged with the Zener diode 42 and under normal conditions the coil 44 is deenergized. The switch 34 which disconnects the main charging circuit in actuality is a second arm operated by the actuation of the relay coil 44. The relay coil 44, contact arm 45 and contact arm 34 constitute a relay 47. The contact arm 45 is movable between contacts 50 and 51. Contacts 51 are connected through current limiting resistor 53 and lead 54 to sense the voltage across the load 15. To best explain the purpose of this particular connection a typical operation will be described.

As was stated, when the power supply 12 is off, the battery 10 supplies power to the load 15 thus discharging the battery to some extent. When the power supply 12 is on, it powers the load 15 and also supplies charging current through transistor 32 to recharge the battery 10, and supplies an expendable trickle current through resistors 38 and 39 to aid in a recharging of the battery. The circuit at this point is designed such that the voltage difference between the output of the power supply 12 and the discharged battery is not sufficient to overcome the threshold; that is, the voltage difference is not greater than the breakdown voltage of the Zener diode 42 and consequently contact arm 45 remains on contacts 50 and relay coil 44 remains deenergized. Suppose now that the battery voltage drops below its designed discharge value, or the battery shorts out. The voltage difference between points 29 and 30 will therefore be great enough to break down the Zener diode 42. The current flow resulting from the breakdown of the Zener diode 42 energizes the relay coil 44 which then opens, or disconnects, the main charging circuit. This is due to the fact that the switch 34, it will be remembered, is a contact arm of the relay 47. Energization of the relay coil 44 also causes the contact arm 45 to switch to contacts 51. As long as there is a predetermined voltage across the load 15, the relay coil 44 will receive continuous energization therefrom through lead 54 and resistor 53 thereby forming a holding circuit which functions to keep the charging circuit open. The charging circuit will thereafter be closed and reconnected upon the occurrence of either one of two events. One of these conditions is that the battery voltage rises to a level where the voltage difference across the relay coil 44 will be insufficient to keep it energized and contact arm 35 will switch over to contacts 50 and the charging circuit, through the action of switch 34, will be reconnected. The other condition for closing the charging circuit is if the voltage across the load drops below a predetermined value to thereby deenergize the relay coil 44. This second condition always occurs when the power supply 12 is in its off period of operation such as during an orbital night. With the charging circuit thus reconnected during the orbital night, the satellite enters each orbital sunrise with the battery 10 connected to receive a charging current. If the battery defect was temporary and if it corrected itself during the orbital night, operation will thereafter proceed in a normal manner until a subsequent battery failure. If the battery 10 did not correct itself during the orbital night the charging circuit is held disconnected when a voltage appears across the load 15 as previously described. It is therefore seen that the arrangement of FIG. 1 does not permanently disconnect a battery from the system but periodically checks the condition of the battery and if the malfunction of the battery has been corrected, will again put it back in the circuit for normal operation. As an incident to this operation the battery 10 is continuously supplied with a small expendable trickle charge when the power supply 12 is on. This trickle charge is substantially less than charging current delivered by the main charging circuit.

Diodes 26, 56 and 57 are provided to prevent current from battery 10 from flowing back to the power supply 12 during its off period of operation. Diode 23 is provided in order to prevent lead 27 current from entering the battery 10.

FIG. 3 illustrates an arrangement according to the teachings of the present invention, and wherein reliability is manifestly increased. Basically, the circuit of FIG. 3 is a redundant version of the circuit of FIG. 2 and like components have similar reference numerals and primed reference numerals.

When the power supply is in its on period of operation, current is supplied through lead 27, through diode 26 to the load 15, and excess current is supplied through the charging circuit including transistor 32 to battery 10, and through the charging circuit including transistor 32' to the battery 10'. Each of the batteries 10 and 10' has a first terminal connected to a common circuit point illustrated as ground, and a second terminal connected to respective points 30 and 30'. When the power supply 12 is in its off period of operation, the battery with the highest voltage will power the load 15. This is accomplished by the provision of diodes 23 and 23' with the load terminal 60 connected therebetween. By way of example, suppose that the voltage of battery 10 is in the order of 30 volts and the voltage of battery 10' is in the order of 28 volts. Assuming that the voltage drop across diode 23 is in the order of 0.5 volt, the voltage at the cathode thereof will be 30 volts −0.5 volt or 29.5 volts. This 29.5 volts is the voltage across the load 15 and in addition is the voltage appearing at the cathode of diode 23'. Since the voltage at the anode of diode 23' (28 volts) is lower than the voltage at its cathode, (29.5 volts) the diode 23' is in a cut-off condition and power is supplied to the load 15 solely by the battery 10. Conversely, if the voltage of battery 10' should rise above the voltage of battery 10, the voltage at the cathode of diode 23 will be greater than the voltage at its anode and the battery 10' will provide power to load 15.

If during the course of operation a battery, for example battery 10, malfunctions such that point 30 falls below a predetermined value with respect to point 29, the Zener diode 42 will break down causing activation of relay 47 thereby to open switch 34 thereby disconnecting the charging circuit for the battery 10. Since the load 15 will still be receiving power, the voltage thereacross is utilized to hold the relay 47 activated by virtue of lead 54 and resistor 53 as was previously explained with respect to FIG. 2. When the power supply 12 enters into its off period of operation, the battery 10' will be supplying power to the load and therefore the charging circuit for battery 10 is kept open. If the malfunction of battery 10 was temporary, it may still be charged up by the expendable trickle charge current through diode 56 and resistors 38 and 39. If the battery 10 does get charged up by the trickle charge current, its voltage will rise and a reclosing of the charging circuit will take place. If the trickle charge does not charge up the battery 10 the charging circuit will remain open. With the battery 10 temporarily out of service, orbital day operation will be governed by the power supply 12 and orbital night operation by the battery 10'. If during the orbital day the battery 10' malfunctions, Zener diode 42' will have its threshold voltage exceeded thereby opening switch 34' and disconnecting the charging circuit for battery 10'. The expandable trickle charge current through diode 56' and resistors 38' and 39' will try to recharge battery 10'. When the power supply 12 goes into its off period of operation, and with the two batteries 10 and 10' not providing sufficient voltage, the voltage across the load 15 will decrease to a point where the relays 47 and 47' are no longer activated and therefore the charging circuits for both batteries will be reconnected to receive a charging current at the next orbital sunrise. If the batteries have corrected their malfunctioning, operation will proceed normally; if the batteries have not corrected their malfunction, the load 15 will receive proper power only during on periods of operation of the power supply 12. In the absence of two complete substantially simultaneous failures of the batteries 10 and 10', the circuit of FIG. 3 operates to provide a load with proper power for both orbital day and orbital night operations and further provides a load with proper power from one of a plurality of batteries having the greatest voltage. The circuit additionally temporarily removes the charging circuit of defective batteries and periodically confirms the permanentness of the defective batteries.

Although FIG. 3 illustrates a circuit utilizing a redundancy in the order of two, it is obvious that higher order redundancies are possible. Although the present invention has been described with a certain degree of particularity, it should be understood that the present disclosure has been made by way of example and that modifications and variations of the present invention are made possible in the light of the above teachings.

What is claimed is:
1. A power supply system comprising:
 (a) a battery;
 (b) power supply means subject to on and off periods of operation;
 (c) means for connecting a load to said battery and said power supply means;
 (d) a charging circuit for said battery, charging current being supplied by said power supply means, and
 (e) circuit means for disconnecting said charging circuit from said battery when the difference in voltage between said power supply means and said battery exceeds a predetermined value and for again connecting said charging circuit when the voltage across said load device falls below a predetermined value.
2. A power supply system comprising:
 (a) a battery;
 (b) a power supply subject to on and off periods of operation;
 (c) means for connecting a load to said battery and said power supply;
 (d) a charging circuit for said battery, charging current being supplied by said power supply; and
 (e) circuit means for disconnecting said charging circuit from said battery when the battery voltage falls below a predetermined value, when said power supply is on, and for reconnecting said charging circuit when
  (1) said power supply is off, or
  (2) the battery voltage rises above said predetermined value.
3. A power supply system comprising:
 (a) a battery;
 (b) a power supply subject to on and off periods of operation;
 (c) means for connecting a load to said battery and said power supply;
 (d) a charging circuit connected between said power supply and said battery for charging said battery during an on period of operation; and
 (e) means including threshold means for keeping said charging circuit open for periods when the power supply voltage exceeds the battery voltage by a predetermined amount.
4. A power supply system comprising:
 (a) a battery;
 (b) a power supply subject to on and off periods of operation;
 (c) means for connecting a load to said battery and said power supply;
 (d) a charging circuit connected between said power supply and said battery for charging said battery during an on period of operation;
 (e) a semiconductor threshold device connected in a circuit path between said power supply and said battery; and
 (f) means in said circuit path for disconnecting said charging circuit whenever the voltage across said semiconductor threshold device exceeds its threshold voltage and for reconnecting said charging circuit when the voltage across said semiconductor threshold device falls below its threshold voltage.
5. A power supply system comprising:
 (a) a battery;
 (b) a power supply subject to on and off periods of operation;
 (c) means for connecting a load to said battery and said power supply;
 (d) a charging circuit for said battery, charging current being supplied by said power supply;
 (e) a Zener diode connected in a circuit path between said power supply and said battery; and
 (f) means in said circuit path for disconnecting said charging circuit whenever the voltage across said Zener diode exceeds its Zener breakdown voltage and for reconnecting said charging circuit when the voltage across said Zener diode falls below its Zener breakdown voltage.

6. A power supply system comprising:
(a) a battery;
(b) a power supply subject to on and off periods of operation;
(c) means for connecting a load to said battery and said power supply;
(d) a main charging circuit connected between said power supply and said battery for delivering a charging currrent to said battery;
(e) an auxiliary charging circuit connected between said power supply and said battery for delivering a trickle charge current substantially less than said charging current, to said battery;
(f) a threshold circuit responsive to the voltage difference between said power supply and said battery for disconnecting said main charging circuit if said voltage difference exceeds a predetermined value, and for again connecting said main charging circuit when said voltage difference falls below said predetermined value; and
(g) said auxiliary charging circuit being continuously connected between said power supply and said battery even during operation of said threshold circuit.

7. A power supply system comprising:
(a) a battery;
(b) a power supply subject to on and off periods of operation;
(c) means for connecting a load to said battery and said power supply;
(d) a first circuit path connected between said power supply and said battery and including
   (1) a transistor, and
   (2) a switch
(e) a second circuit path connected between said power supply and said battery and including
   (1) a threshold device, and
   (2) means for opening said switch if the threshold voltage of said threshold device is exceeded; and
(f) means for keeping said switch open as long as said threshold voltage is exceeded.

8. A battery charging circuit according to claim 7 which includes a charge limiting resistor in the first circuit path.

9. A power supply system comprising:
(a) a battery;
(b) a power supply subject to on and off periods of operation;
(c) means for connecting a load to said battery and said power supply;
(d) a charging circuit supplied by current from said power supply for charging said battery;
(e) a relay operable in a first and second state for opening and closing said charging circuit and being normally in one of said states, wherein said charging circuit is closed; and
(f) means for changing said relay to its opposite state to open said charging circuit for periods when the power supply voltage exceeds the battery voltage by a predetermined amount.

10. A power supply system comprising:
(a) a battery;
(b) a power supply subject to on and off periods of operation;
(c) means for connecting a load to said battery and said power supply;
(d) a charging circuit for said battery, charging current being supplied by said power supply;
(e) circuit means for disconnecting said charging circuit from said battery when the difference in voltage between said power supply and said battery exceeds a predetermined value and for again connecting said charging circuit when the voltage across said load device falls below a predetermined value;
(f) threshold means for changing said relay to its opposite state to open said charging circuit if the voltage of said power supply exceeds the battery voltage by a predetermined amount; and
(g) a holding circuit responsive to the voltage across said load for keeping said relay in said opposite state as long as said load voltage exceeds a predetermined value.

11. A battery charging circuit according to claim 9 which includes a semiconductor threshold device in series with the relay coil of said relay.

12. A power supply system comprising:
(a) a plurality of batteries;
(b) power supply means subject to on and off periods of operation;
(c) means for connecting a load to said plurality of batteries and said power supply means;
(d) a plurality of charging circuits each connected to said power supply means for supplying charging current to a respective one of said batteries; and
(e) circuit means for disconnecting a charging circuit from its respective battery when the difference in voltage between said power supply means and the respective battery exceeds a predetermined value and for again connecting said charging circuit when the voltage across said load device falls below a predetermined value.

13. A power supply system comprising:
(a) a plurality of batteries;
(b) power supply means subject to on and off periods of operation;
(c) means for connecting a load to said plurality of batteries and said power supply means;
(d) a main charging circuit for each said battery connected between said power supply and a respective one of said batteries for supplying charging current to said batteries;
(e) a plurality of auxiliary charging circuits each connected to a respective one of said batteries for supplying a trickle charge current substantially less than said charging current to each of said batteries;
(f) threshold circuit means for each said battery for disconnecting its respective main charging circuit if the voltage difference between said power supply means and the respective battery exceeds a predetermined value; and
(g) each one of said auxiliary charging circuits being continuously connected between said power supply means and its respective battery.

14. A power supply system comprising:
(a) a plurality of batteries each having a first and second terminal with the first terminal of each said battery being connected to a common circuit point;
(b) a power supply subject to on and off periods of operation;
(c) circuit means connected between said power supply and the second terminal of each said battery for
   (1) supplying charging current to each said battery, and
   (2) discontinuing said charging current upon the occurrence of certain predetermined conditions;
(d) a load having an input terminal; and
(e) means connected to each said battery for insuring that the battery in the highest charge state provides power to said load during an off period of operation of said power supply.

15. A power supply system comprising:
(a) a plurality of batteries each having a first and second terminal with the first terminal of each said battery being connected to a common circuit point;

(b) a power supply subject to on and off periods of operation;
(c) circuit means connected between said power supply and the second terminal of each said battery for
  (1) supplying charging current to each said battery, and
  (2) discontinuing said charging current upon the occurrence of certain predetermined conditions;
(d) a load having an input terminal;
(e) a plurality of diodes each having a first electrode connected to a respective one of said second terminals of said batteries and a second electrode commonly connected together; and
(f) said commonly connected electrodes of said diodes being connected to the input terminal of said load.

References Cited

UNITED STATES PATENTS

| | | | |
|---|---|---|---|
| 3,317,809 | 5/1967 | Bowers et al. | 320—30 |
| 2,051,514 | 8/1936 | Block | 320—40 |
| 2,309,054 | 1/1943 | Fell | 307—86 X |
| 3,127,552 | 3/1964 | Stead | 320—2 |
| 3,201,650 | 8/1965 | Schultz | 307—130 X |
| 3,223,913 | 12/1965 | Kalns et al. | 320—39 |
| 3,231,750 | 1/1966 | Burley | 307—39 |
| 3,243,658 | 3/1966 | Blackburn | 317—31 |
| 3,262,018 | 7/1966 | Bogaerts et al. | 307—94 X |

JOHN F. COUCH, *Primary Examiner.*

S. WEINBERG, *Assistant Examiner.*

U.S. Cl. X.R.

320—19, 23, 40, 54; 307—66, 94; 317—27, 31